United States Patent
Nagar et al.

(10) Patent No.: US 9,982,617 B2
(45) Date of Patent: May 29, 2018

(54) ON-BOARD DIAGNOSTICS FOR AN OPPOSED-PISTON ENGINE EQUIPPED WITH A SUPERCHARGER

(71) Applicant: Achates Power, Inc., San Diego, CA (US)

(72) Inventors: Nishit Nagar, San Diego, CA (US); Arunandan Sharma, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 26 days.

(21) Appl. No.: 14/560,612

(22) Filed: Dec. 4, 2014

(65) Prior Publication Data

US 2016/0160781 A1 Jun. 9, 2016

(51) Int. Cl.
| | |
|---|---|
| *F02D 41/22* | (2006.01) |
| *F02B 75/02* | (2006.01) |
| *F02B 25/08* | (2006.01) |
| *F02B 37/04* | (2006.01) |
| *F02D 23/02* | (2006.01) |
| *F02D 41/00* | (2006.01) |
| *F02B 33/34* | (2006.01) |
| *F02B 39/16* | (2006.01) |
| *F02D 41/18* | (2006.01) |

(52) U.S. Cl.
CPC ............ *F02D 41/221* (2013.01); *F02B 25/08* (2013.01); *F02B 33/34* (2013.01); *F02B 37/04* (2013.01); *F02B 39/16* (2013.01); *F02B 75/02* (2013.01); *F02D 23/02* (2013.01); *F02D 41/0007* (2013.01); *F02D 41/222* (2013.01); *F02B 2075/025* (2013.01); *F02D 41/18* (2013.01); *Y02T 10/144* (2013.01); *Y02T 10/40* (2013.01)

(58) Field of Classification Search
CPC ... Y02T 10/144; F02D 41/0007; F02D 23/00; F02D 41/223; F02D 41/222; F02D 41/007; F02D 23/02; F02D 41/221; F02B 75/02; F02B 33/34; F02B 37/04
See application file for complete search history.

(56) References Cited

U.S. PATENT DOCUMENTS

| | | | |
|---|---|---|---|
| 5,546,795 | A | 8/1996 | Yamagishi |
| 6,155,952 | A | 12/2000 | Antonov |
| 6,363,713 | B1 | 4/2002 | Wu et al. |
| 6,892,569 | B2 | 5/2005 | Martin et al. |
| 7,055,507 | B2 | 6/2006 | Kelley, Jr. |

(Continued)

FOREIGN PATENT DOCUMENTS

| | | |
|---|---|---|
| DE | 102008054514 A1 | 6/2010 |
| EP | 2487356 A2 | 8/2012 |

(Continued)

OTHER PUBLICATIONS

International Search Report and Written Opinion for PCT application PCT/US2015/062292, mailed Mar. 1, 2016.

(Continued)

*Primary Examiner* — Sizo Vilakazi
(74) *Attorney, Agent, or Firm* — Terrance M. Meador

(57) ABSTRACT

On-board diagnostic monitoring of a two-stroke cycle, opposed-piston engine includes diagnostic monitoring of an air handling system equipped with a supercharger to determine whether the supercharger is functioning properly.

11 Claims, 8 Drawing Sheets

(56) References Cited

U.S. PATENT DOCUMENTS

| | | | |
|---|---|---|---|
| 7,076,952 B1* | 7/2006 | Vetrovec | F02B 33/44 |
| | | | 123/559.1 |
| 7,134,273 B2 | 11/2006 | Mazur et al. | |
| 7,251,989 B2 | 8/2007 | Baeuerle | |
| 7,337,766 B2 | 3/2008 | Nakayama et al. | |
| 7,353,699 B2 | 4/2008 | Rollinger et al. | |
| 7,437,874 B2 | 10/2008 | Ramamurthy et al. | |
| 7,628,063 B2 | 12/2009 | Yezerets et al. | |
| 7,832,200 B2 | 11/2010 | Kesse et al. | |
| 8,386,204 B2 | 2/2013 | Clanflone et al. | |
| 8,515,710 B2 | 8/2013 | Wang et al. | |
| 8,596,045 B2 | 12/2013 | Tuomivaara et al. | |
| 8,818,659 B2 | 8/2014 | Sujan et al. | |
| 8,818,661 B2 | 8/2014 | Keilers et al. | |
| 8,852,050 B2 | 10/2014 | Thomassy | |
| 9,206,751 B2 | 12/2015 | Herold et al. | F02B 25/08 |
| 9,284,884 B2 | 3/2016 | Nagar et al. | F02B 47/08 |
| 9,512,790 B2 | 12/2016 | Nagar | F02B 25/08 |
| 2003/0019212 A1 | 1/2003 | Baeuerie et al. | |
| 2004/0216519 A1* | 11/2004 | Baeuerle | F02B 39/16 |
| | | | 73/114.38 |
| 2007/0073467 A1* | 3/2007 | Hill | F02D 35/02 |
| | | | 701/105 |
| 2007/0130945 A1 | 6/2007 | Rollinger et al. | |
| 2007/0163258 A1 | 7/2007 | Narita et al. | |
| 2010/0043746 A1 | 2/2010 | Hartmann et al. | |
| 2012/0085314 A1* | 4/2012 | Cleeves | F02B 25/08 |
| | | | 123/294 |
| 2012/0125298 A1* | 5/2012 | Lemke | F01B 7/14 |
| | | | 123/51 B |
| 2012/0137678 A1* | 6/2012 | Brahma | F02B 37/12 |
| | | | 60/605.1 |
| 2014/0373814 A1 | 12/2014 | Herold et al. | F02D 41/00 |
| 2014/0373815 A1 | 12/2014 | Nagar et al. | F02B 75/28 |
| 2014/0373816 A1 | 12/2014 | Nagar | F02D 41/00 |
| 2015/0240826 A1 | 8/2015 | Leroy et al. | |
| 2015/0285176 A1 | 10/2015 | Kubota | |

FOREIGN PATENT DOCUMENTS

| | | |
|---|---|---|
| FR | 2995354 A1 | 3/2014 |
| WO | WO-2011/146111 A1 | 11/2011 |
| WO | WO-2013/126347 A1 | 8/2013 |
| WO | WO-2014/069243 A1 | 5/2014 |

OTHER PUBLICATIONS

Office Action dated Apr. 29, 2016 in U.S. Appl. No. 14/404,396.
Amendment dated Jul. 29, 2016 in U.S. Appl. No. 14/404,396.
Final Rejection dated Oct. 12, 2016 in U.S. Appl. No. 14/404,396.
*Thales Visionix* v. *United States*, No. 2015-5150 (Fed. Cir. Mar. 8, 2017).
Jan. 2018: Eligibility Quick Reference Sheet, downloaded Jan. 12, 2018 from https://www.uspto.gov/sites/default/files/documents/leg-qrs.pdf.

\* cited by examiner

ON-BOARD DIAGNOSTICS FOR AN OPPOSED-PISTON ENGINE EQUIPPED WITH A SUPERCHARGER

RELATED APPLICATIONS

This application contains subject matter related to the subject matter of commonly owned U.S. application Ser. No. 13/926,360, filed Jun. 25, 2013; commonly-owned U.S. application Ser. No. 13/974,883, filed Aug. 23, 2013; and, commonly-owned U.S. application Ser. No. 13/974,935, filed Aug. 23, 2013.

BACKGROUND

The field is internal combustion engines, particularly two-stroke cycle, opposed-piston engines. More specifically, the field is related to on-board diagnostic monitoring of the air handling systems of opposed-piston engines equipped with superchargers to determine whether the superchargers are functioning properly. The field also includes diagnostic monitoring of opposed-piston air handling elements associated with supercharger operations.

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed in the bore of a cylinder for reciprocating movement in opposing directions along the central axis of the cylinder. Each piston moves between a bottom center (BC) location where it is nearest one end of the cylinder and a top center (TC) location where it is furthest from the one end. The cylinder has ports formed in the cylinder sidewall near respective BC piston locations. Each of the opposed pistons controls one of the ports, opening the port as it moves to its BC location, and closing the port as it moves from BC toward its TC location. One of the ports serves to admit charge air (sometimes called "scavenging air") into the bore, the other provides passage for the products of combustion out of the bore; these are respectively termed "intake" and "exhaust" ports (in some descriptions, intake ports are referred to as "air" ports or "scavenge" ports). In a uniflow-scavenged opposed-piston engine, pressurized charge air enters a cylinder through its intake port as exhaust gas flows out of its exhaust port, thus gas flows through the cylinder in a single direction ("uniflow")—from intake port to exhaust port.

With reference to FIG. 1, a two-stroke cycle internal combustion engine is embodied in an opposed-piston engine 10 having at least one ported cylinder 50. For example, the engine may have one ported cylinder, two ported cylinders, three ported cylinders, or four or more ported cylinders. Each ported cylinder 50 has a bore 52 and longitudinally spaced intake and exhaust ports 54 and 56 formed or machined in respective ends of a cylinder wall. Each of the intake and exhaust ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slideably disposed in the bore 52 of each cylinder with their end surfaces 61 and 63 opposing one another. Movements of the pistons 60 control the operations of the intake ports 54. Movements of the pistons 62 control the operations of the exhaust ports 56. Thus, the ports 54 and 56 are referred to as "piston controlled ports". Pistons 60 controlling the exhaust ports ("exhaust pistons") are coupled to a crankshaft 71. Pistons 62 controlling the intake ports of the engine ("intake ports") are coupled to a crankshaft 72.

As pistons 60 and 62 approach respective TC locations, a combustion chamber is defined in the bore 52 between the end surfaces 61 and 63. Fuel is injected directly into the combustion chamber through at least one fuel injector nozzle 70 positioned in an opening through the sidewall of a cylinder 50. The fuel mixes with charge air admitted through the intake port 54. As the mixture is compressed between the end surfaces it reaches a temperature that causes the fuel to ignite; in some instances, ignition may be assisted, as by spark or glow plugs. Combustion follows.

The engine 10 includes an air handling system 80 that manages the transport of charge air provided to, and exhaust gas produced by, the engine 10. A representative air handling system construction includes a charge air subsystem and an exhaust subsystem. The charge air subsystem receives and compresses air and includes a charge air channel that delivers the compressed air to the intake port or ports of the engine. One or more stages of compression may be provided. For example, the charge air subsystem may comprise one or both of a turbine-driven compressor and a supercharger. The charge air channel typically includes at least one air cooler that is coupled to receive and cool the charge air (or a mixture of gasses including charge air) before delivery to the intake port or ports of the engine. The exhaust subsystem includes an exhaust channel that transports exhaust products from exhaust ports of the engine for delivery to other exhaust components.

A typical air handling system for an opposed-piston engine is shown in FIG. 1. The air handling system 80 may comprise a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 56 and flows into an exhaust channel 124 directly from the exhaust port or ports 56, or from an exhaust manifold 125 or an exhaust plenum that collects exhaust gasses output through the exhaust port or ports 56. In this regard, the turbine 121 is rotated by exhaust gas passing through it. This rotates the compressor 122, causing it to generate charge air by compressing fresh air. Charge air output by the compressor 122 flows through a charge air channel 126 to a cooler 127 whence it is pumped by a supercharger 110 to the intake ports. Charge air compressed by the supercharger 110 can be output through a cooler 129 to an intake manifold 130 or an intake plenum for provision to the intake port or ports 54. In some instances, exhaust products may be recirculated into the charge air channel through an exhaust gas recirculation (EGR) channel 131 for the purpose of reducing unwanted emissions.

The opposed-piston engine is provided with an engine control mechanization—a computer-based system including one or more electronic control units coupled to associated sensors, actuators, and other machinery throughout the engine that governs the operations of various engine systems, including the air handling system, a fuel system, a cooling system, and other systems. The engine control elements that govern the air handling system are referred to collectively as the "air handling control mechanization".

In an air handling system for a two-stroke cycle, opposed-piston engine, the supercharger performs a number of important functions. For example, it provides a positive charge air pressure to drive uniflow scavenging through the cylinders. In addition, the supercharger delivers boost (increased air pressure) when the engine accelerates. Further, the supercharger may be employed to pump recirculated exhaust products through the EGR channel. In many instances, the supercharger is one of the key components of the air handling system in an opposed-piston engine. Deterioration of supercharger performance can have significant negative impact on the emissions, general performance, and durability of the engine.

Manifestly, it is important to monitor and diagnose the performance of the supercharger and provide clear indications when its performance falls below an acceptable limit. Accordingly, there is a need for air handling control mechanizations for opposed-piston engines that are capable of confirming that a supercharger is operating correctly, and diagnosing and reporting faults that may occur in supercharger operation.

Optimal operation of a supercharger may require an additional element that enables modulation of the pressure of charge air output by the supercharger. In this regard, it is frequently the case that the supercharger's impeller is coupled to a crankshaft by a direct drive element such that the impeller cannot rotate independently of the crankshaft. The fixed relationship between supercharger and crankshaft affords a rigid and imprecise regulation of boost (charge air compressed by the supercharger). In order to modulate boost pressure and gain greater precision in charge air handling under such conditions, a bypass valve is provided in fluid communication with the charge air channel downstream of the supercharger outlet to adjust the pressure of boost air produced by the supercharger as needed in response to engine operation. In other instances, the supercharger may be driven by a variable speed device with a transmission that enables the supercharger's speed to be controlled independently of the crankshaft.

In some instances, an apparent deterioration of supercharger performance can result from faulty performance of an element that controls or modulates the supercharging operation. For example, a sticky supercharger bypass valve or a faulty bypass valve actuator can impair the air handling system's boost response in a way that is indistinguishable from the performance of a supercharger with a defective belt. In another instance, a variable speed supercharger drive with a deteriorating transmission can cause boost pressure fluctuation, as would happen in the case of a supercharger with compromised rotors.

Manifestly, it is important to continuously monitor and diagnose the performances of elements that control or modulate supercharger operations, and to take appropriate actions if performance of such an element falls below an acceptable limit. Accordingly, there is a need for air handling control mechanizations for opposed-piston engines that are capable of confirming that air handling system elements that affect supercharger operations are operating correctly, and diagnosing and reporting faults that may occur in their operations.

SUMMARY

It is therefore advantageous to incorporate diagnostics into the control mechanization of an air handling system for an opposed-piston engine equipped with a supercharger that monitor the supercharger and detect faults that would keep it from delivering a desired supply of compressed charge air to the intake ports of the engine.

It is further desirable to invest such diagnostics with the capability of monitoring elements that control or modulate supercharger operations and detecting faults in those elements that would keep the supercharger from delivering a desired supply of compressed charge air to the engine.

In some instances it is desirable to incorporate diagnostics into the control mechanization of an air handling system for an opposed-piston engine that monitor the supercharger, as well as one or both of a supercharger bypass valve and a supercharger variable speed drive, to detect faults that would keep the supercharger from delivering a desired supply of compressed charge air to the intake ports of the engine.

A two-stroke cycle, opposed-piston engine is equipped with an engine control mechanization that monitors and governs engine operations, including the operation of an air handling system with a supercharger. According to one aspect, the air handling control mechanism includes a diagnostic system to confirm that the supercharger is operating correctly. The diagnostic system diagnoses and reports faults that may occur in supercharger operation. Preferably, the diagnostic system is an on-board diagnostics arrangement.

According to another aspect, an air handling control mechanism executes a diagnostic method that monitors supercharger operation and reports faults that would keep the supercharger from delivering a desired supply of pressurized charge air to the intake ports of an opposed-piston engine. Preferably, the diagnostic method is performed by an on-board diagnostics system.

According to yet another aspect, the air handling control mechanism includes a diagnostic system and methods performed thereby to confirm that the supercharger and one of a supercharger bypass valve and a supercharger variable speed drive are operating correctly. Preferably, the diagnostic system is an on-board diagnostics arrangement.

BRIEF DESCRIPTION OF THE DRAWINGS

The below-described drawings are meant to illustrate principles and examples discussed in the following disclosure. They are not necessarily to any scale.

DETAILED DESCRIPTION

Figure 1:
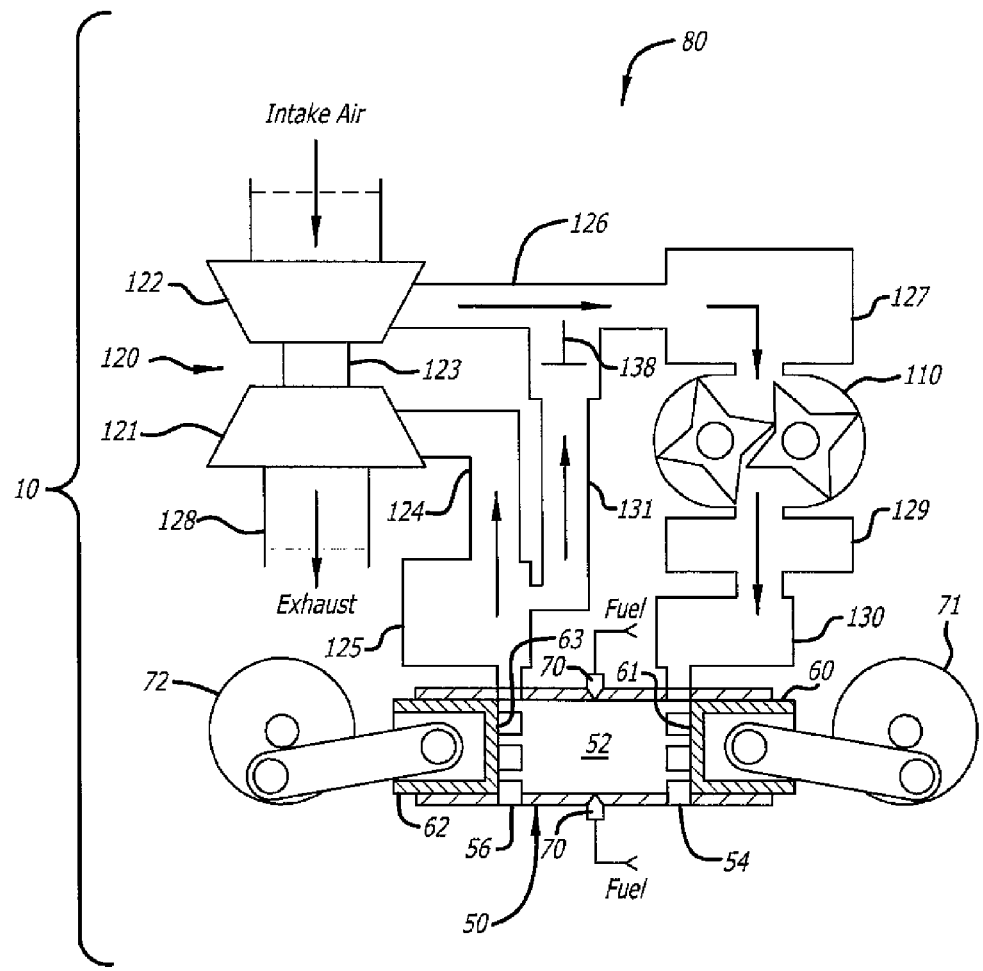
FIG. 1 is a diagram of an opposed-piston engine equipped with an air handling system and is properly labeled "Prior Art".
Figure 2:
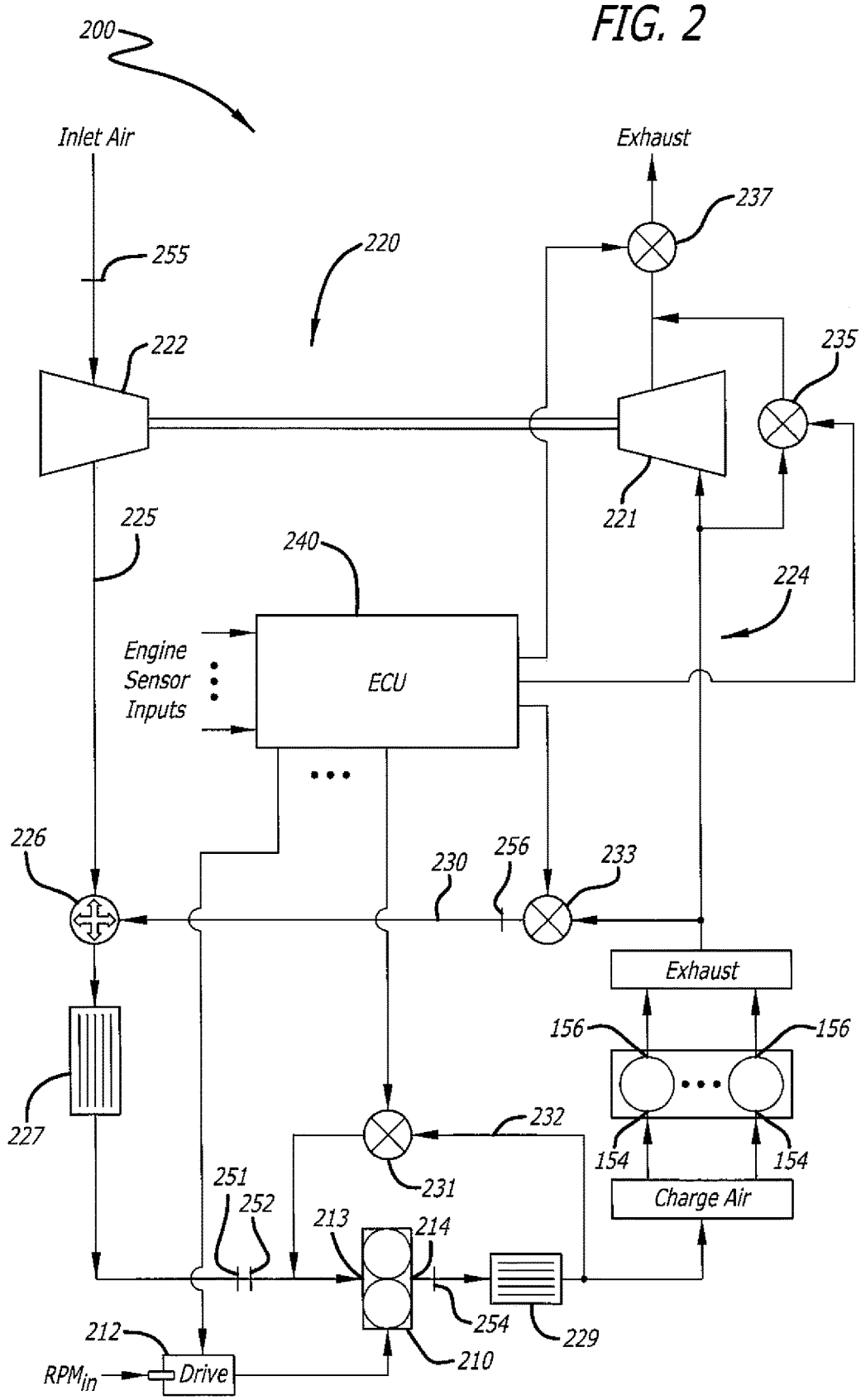
FIG. 2 is a schematic drawing of an air handling system of a two-stroke cycle, opposed-piston engine equipped with a control mechanization that includes a diagnostic system for monitoring the operation of a supercharger with which the air handling system is equipped with on-board diagnostics capability.

Opposed-Piston Engine Air Handling System:

An air handling system 200 for a two-stroke cycle, opposed-piston engine 201 such as the engine illustrated by FIG. 1 is shown in schematic form in FIG. 2. The air handling system 200 includes a supercharger 210 which receives input rotary power from a drive unit 212. Although the figure shows the drive unit 212 separately from the supercharger 210, this is not meant to exclude the option of integrating these elements into a single unit. The supercharger 210 includes an inlet 213 and an outlet 214.

Preferably, but not necessarily, the air handling system 200 also includes a turbocharger 220 with a turbine 221 and a compressor 222. The turbine 221 is coupled to an exhaust channel 224 and the compressor 222 is coupled to a charge air channel 225. The turbine 221 is spun by exhaust gas expelled from the exhaust ports 156 of the engine and transported through the exhaust channel 224. This spins the compressor 222, causing it to generate charge air by compressing inlet air that flows into the charge air channel. Compressed charge air output by the compressor 222 is transported through the charge air channel 225 to a cooler 227. In this configuration, the supercharger 210 constitutes a second stage of compression in the air handling system 200 (following the compressor 222). In any case, the supercharger 210 compresses air in the charge air channel and provides compressed charge air (sometimes called "boost") to the intake ports 154 of the opposed-piston engine. In some instances, a cooler 229 may be provided to cool the output of the supercharger 210. Optionally, the air handling system may include an EGR branch 230 to transport exhaust products from the exhaust channel 224 to the charge air channel 225 via an EGR mixer 226.

Control of the gas transport configuration of the air handling system is implemented by a mechanization that includes an ECU (engine control unit) 240, air handling processes executed on the ECU, air handling valves and associated actuators, the supercharger 210, and engine sensors. Air handling system control is exercised by settings of variable valves. In this regard, for example, a supercharger bypass valve 231 bleeds charge air produced by the supercharger 210 through a bypass channel 232 so as to modulate charge air pressure, and dampen surges, at the intake ports 154. An EGR valve 233 adjusts the amount of exhaust gas that is transported through the EGR branch 230 to the charge air channel 225 for control of emissions. A wastegate valve 235 shunts exhaust gas around the turbine 221 in order to protect turbocharger components against pressure surges in the air handling system. A backpressure valve 237 regulates exhaust pressure at the turbine outlet in order to warm the engine quickly during start-up. For fast, precise automatic operation, it is preferred that these and other valves in the air handling system be high-speed, computer-controlled devices, with continuously-variable settings. The ECU 240 is in control communication with actuators (not seen) that operate the valves in response to ECU-issued control signals.

The ECU 240 monitors air handling system operating conditions by way of various air handling sensors. In this regard, for example, supercharger intake and outlet charge air pressures are measured with gas pressure sensors 252 and 254, respectively. Air mass flow into the charge air subsystem is measured by sensor 255; exhaust mass flow in the EGR channel is measured by sensor 256; and gas temperature at the supercharger inlet 213 is measured by gas temperature sensor 257. For purposes of this specification these and other sensors may comprise physical measurement instruments and/or virtual systems. The sensor positions shown in the figures are indicative of locations where in the air handling system the measured parameter value could be obtained if measured by a physical instrument.

In most cases, to obtain the rotary power necessary to its operation, the supercharger 210 is directly coupled to the engine-usually via a crankshaft-driven drive apparatus. In these cases the speed of the supercharger is dependent on the speed of the engine. In some instances, it is desirable to be able to vary the supercharger's speed independently of engine speed so as to gain greater flexibility and precision in charge air control, which can improve the air handling operations and contribute to the achievement of optimal engine performance. For example, at low engine speeds when quick acceleration is required, faster rotation of the supercharger delivers higher boost levels than would be available with conventional coupling to an engine crankshaft. Thus, it may be the case that the drive 212 is equipped with a transmission that enables the supercharger to be driven, under command of the air handling control mechanization, at a continuously-, or incrementally-, variable speed, independently of a crankshaft. In some of these instances, the supercharger bypass valve 231 may be redundant. That is to say, the greater the variability in supercharger speed afforded by the variable-speed drive, the less likely a bypass valve would be needed to modulate boost pressure.

However, there may be instances wherein a drive unit is constructed to provide a limited number of speeds (two speeds, for example) and flexibility in control of boost pressure may require the operations of a supercharger bypass valve. Such instances are addressed in this disclosure.

Figure 3:
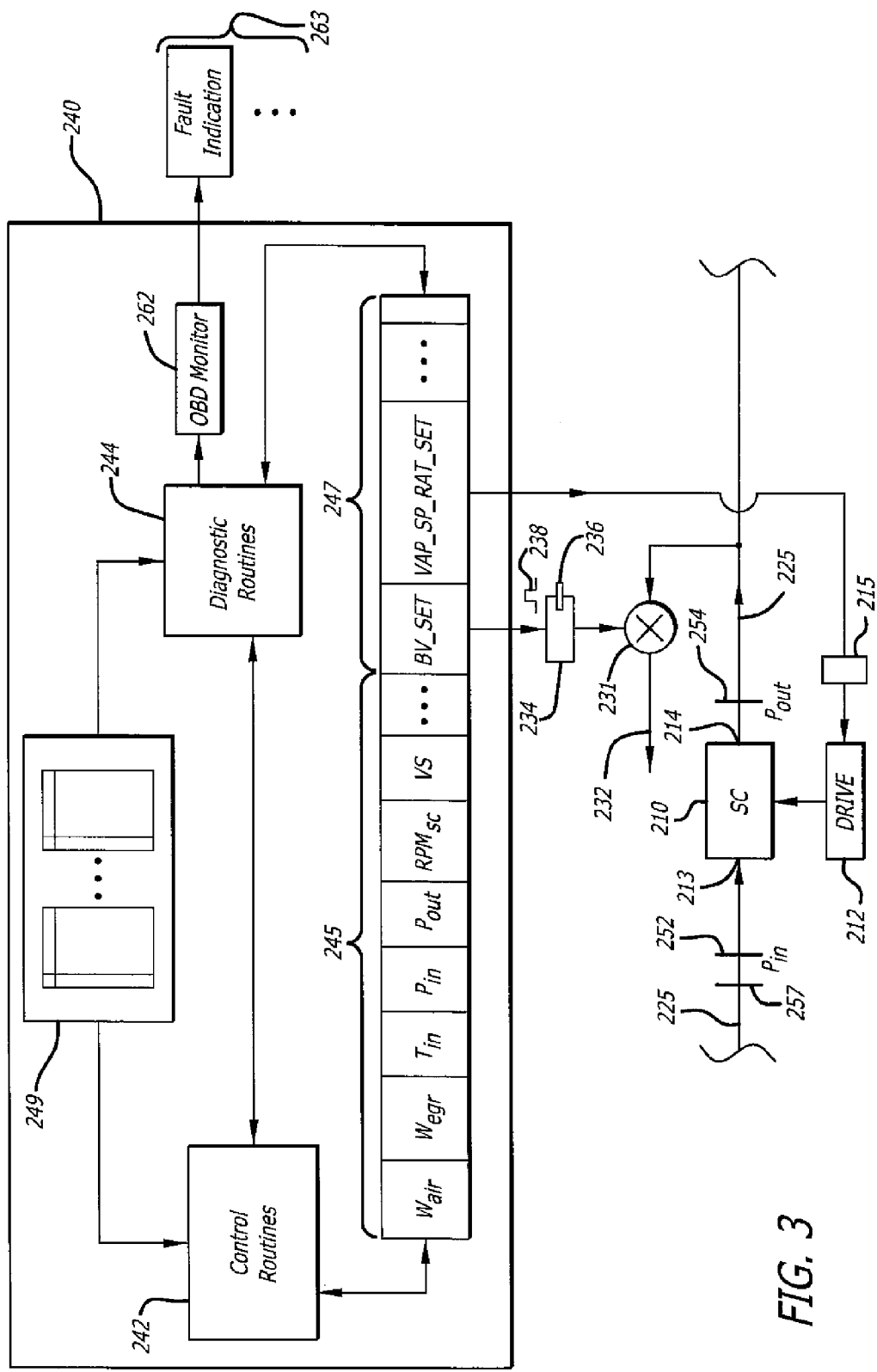
FIG. 3 is a schematic illustration of an on-board diagnostics system that can be used with the air handling system of FIG. 2.

With reference to FIGS. 2 and 3, the ECU 240 executes an air handling control process to configure the gas transport configuration of the air handling system as required by a current engine operating state, in response to engine conditions measured by various engine sensors. The air handling control process includes one or more air handling processes 242 that are continuously executed during engine operation, and one or more diagnostic processes 244 that are recurrently executed as the engine operates. To the extent that the engine is assembled and ready for installation, or already installed, for example in a vehicle or a vessel, with the ECU 240 and the control processes it executes, including diagnostics, available or situated on the installation, the controls and diagnostics are considered to be "on-board." The on-board diagnostics ("OBD") include reporting capabilities that provide information and/or trouble codes, or visual and/or audible indications relating to the operability or inoperability of engine components and systems.

The ECU 240 is constructed with a microprocessor, associated program storage, program memory, and data storage. Code that enables the ECU to conduct various control and diagnostics processes resides in the program storage. Interface electronics associated with or in the ECU format input data signals and generate output control and information signals and connect the ECU with sensors, actuators, displays, indicators, and other peripheral devices.

The ECU 240 executes various engine system control processes, including processes for control of air handling and fuel injection systems. Such processes may include open- and/or closed-loop air handling processes. These processes use values of control parameters associated with operation of an opposed-piston engine air handling system, and execute various procedures to control air handling elements based on the control parameter values. The ECU 240 may obtain control parameter values by any one or more of a number of instrumentalities including sensor measurement, table look-up, calculation, estimation, and program declaration. The description of any particular instrumentality of data obtainment in the following specification is for illustration only and is not intended to exclude, disclaim, or surrender any alternative. The ECU 240 includes registers 245 that receive data signal inputs from sensors, and registers 247 that store commands which are converted to control signals communicated to actuators. For an example of opposed-piston air handling control mechanizations of this type, see commonly-owned U.S. application Ser. No. 13/926,360, filed Jun. 25, 2013 for "Air Handling Control for Opposed-Piston Engines with Uniflow Scavenging."

According to one aspect of this disclosure, a control mechanization for governing an air handling system such as the system 200 of FIG. 2 includes an on-board diagnostic system to confirm that the supercharger 210 is functioning correctly. The diagnostic system diagnoses and reports faults that may occur in the supercharger and in air handling elements associated with supercharger performance. As per FIG. 3, the diagnostic system includes the ECU 240, gas pressure sensors 252 and 254, and one or more diagnostic processes 244 and associated data tables 249 on the ECU 240. Diagnostic results and/or faults are reported by the diagnostic control processes by way of an OBD monitor 262 which causes one or more OBD fault indications to be output. Such fault indications may include one or more of indicator lights and icons, diagnostic codes, and information readouts. The sensor 252 measures the pressure of charge air in the charge air channel upstream of the supercharger, near the supercharger inlet 213. The sensor 254 measures the pressure in the charge air channel downstream of the supercharger, near the supercharger outlet 214.

On Board Diagnostics for the Supercharger and Related Components:

The construction and operation of the supercharger are conventional. A drive unit receives a mechanical input drive, typically obtained from one of the crankshafts, and produces an output drive in response thereto. The output drive is coupled to the input shaft of the supercharger and causes one or more elements of the supercharger's compression mechanism to rotate. As per FIG. 3, air fed at some input pressure ($P_{in}$) into the compression mechanism is compressed (pressurized) and the compressed air is output at some output pressure ($P_{out}$) by the supercharger (SC) 210. The gas pressure sensor 252 measures $P_{in}$; the gas pressure sensor 254 measures $P_{out}$. It is useful to control air handling system operation by varying the rate of flow of compressed charge air output by the supercharger in order to optimize engine performance throughout its operating range. Charge air flow can be varied by way of the bypass channel 232 whose input is in fluid communication with the charge air channel 225, downstream of the supercharger outlet 214. Provision of the bypass valve 231 in the bypass channel 232 enables modulation of charge air pressure downstream of the supercharger outlet 214.

Figure 4:
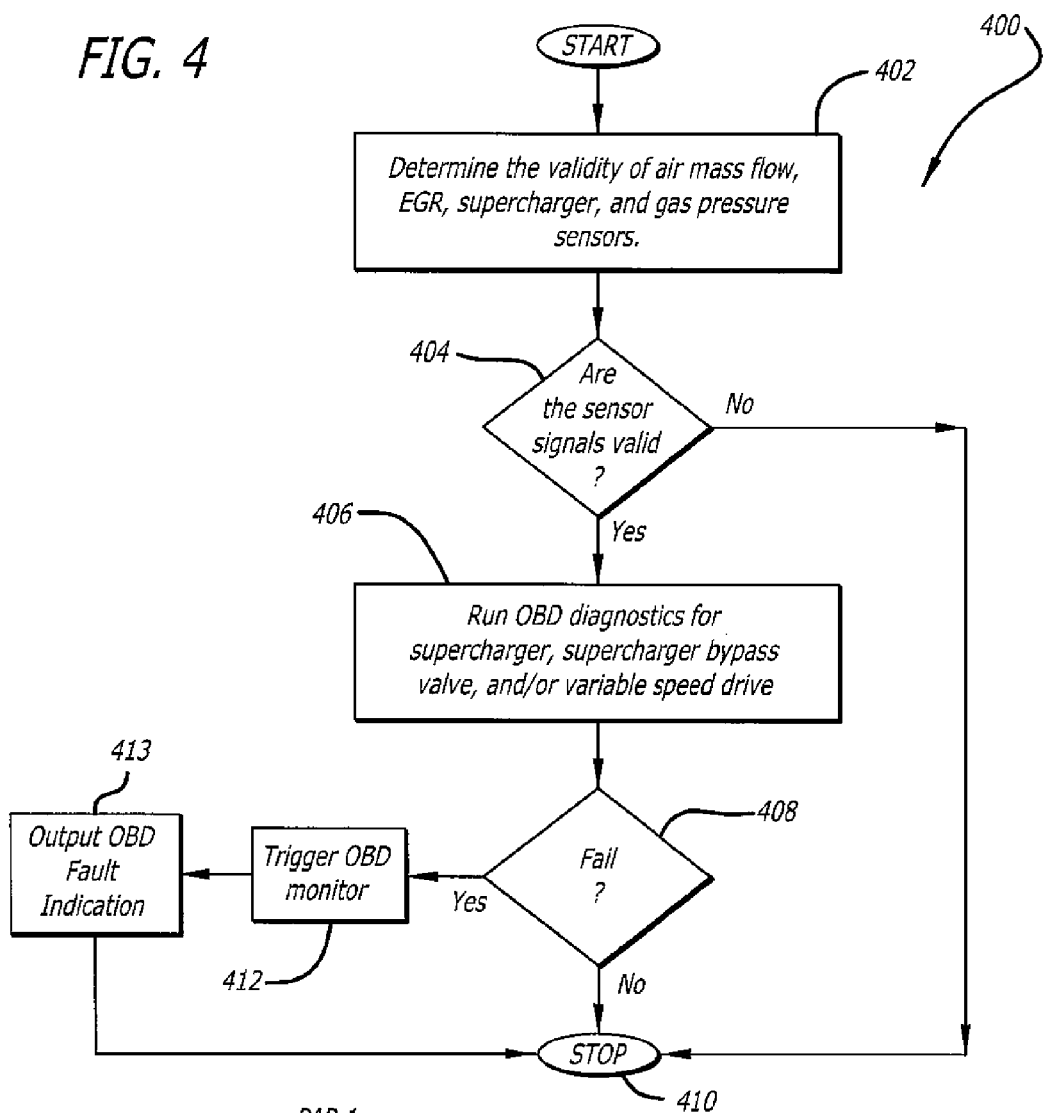
FIG. 4 is a flow diagram of an on-board diagnostics process that can be used with the air handling system of FIG. 2.

With reference to FIGS. 2, 3, and 4, an initial air handling diagnostic process 400 determines if engine air handling performance is within expected parameter values. Specifically, the process 400 monitors and evaluates supercharger performance; in some instances, the process also monitors and evaluates performances of an air handling element immediately associated with supercharger operation, such as the bypass valve 231 and/or the drive 212. The process 400 begins at state 402 by determining operational validity of air handling sensors. In state 402, sensor operations are checked for air mass flow into the charge air subsystem (sensor 255), exhaust mass flow in the EGR channel (sensor 256), and supercharger intake and outlet pressures (sensors 252 and 254, respectively); sensor operations for other measurements are also checked. A check is made in state 404 to determine if the airflow sensors are producing valid data signals. A sensor failure stops the diagnostic process 400 at state 410 since any further diagnostics would be invalid. If the sensor data signals are determined to be valid, one or more of on board supercharger diagnostic, supercharger bypass valve diagnostic, and supercharger variable speed drive diagnostic processes are executed in state 406 to determine if these air handling system elements are functioning within respective established operating parameter values. These OBD processes may be executed in some preferred sequence, simultaneously, or in overlapping fashion. Further, these OBD processes may comprise separate or interleaved routines. In state 408, if these elements are operating within respective design parameters, the diagnostic process 400 is completed and stopped in state 410. If, however, any diagnostic process indicates a fault, the OBD monitor is triggered in state 412, which causes output of an OBD fault indication in state 413. If the fault, or air handling system failure, is severe enough, the air handling control system may shut down the engine.

Supercharger Diagnostic Process:

With reference to FIGS. 2 and 3, and presuming that the engine is equipped with a turbocharger and an EGR branch, the mixer 226 mixes charge air coming out of the compressor 222 with the recirculated exhaust. Thus, with EGR, the mass flow of gas into the supercharger 210 includes mass air flow into the charge air channel, measured by sensor 255, and mass flow of recirculated exhaust through the EGR channel, measured by sensor 256. The mixture is further compressed by the supercharger 210. If the supercharger performance drops below an acceptable limit then the air handling system won't be able to provide the desired amount of charge to the engine, and thus may fail to meet performance requirements. Hence, it is useful to provide an OBD process to evaluate operation of the supercharger.

Figure 5:
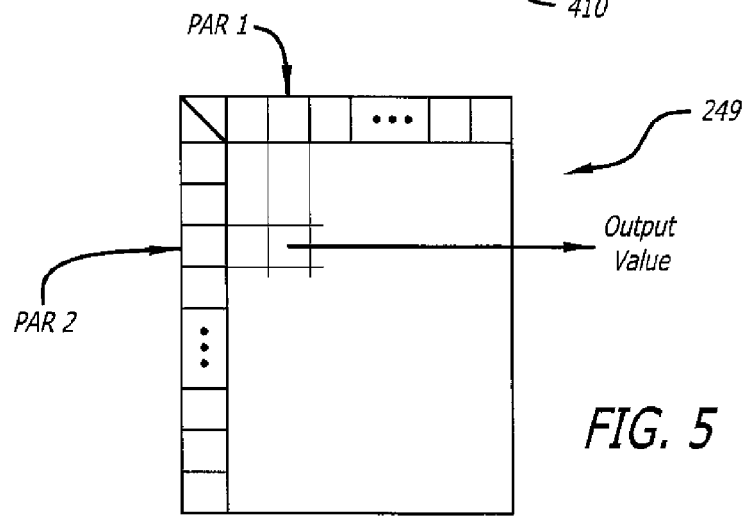
FIG. 5. is a schematic illustration of a table that can be used in on-board diagnostics for the air-handling system of FIG. 2 to relate on-board diagnostics measurements and/or estimates to expected responses by elements being monitored.

Referring now to FIG. 3, a volumetric flow of gas (charge air) through the supercharger 210 is a function of supercharger speed ($RPM_{SC}$) and the pressure ratio ($P_{out}/P_{in}$) across the supercharger 210. This relationship can be mapped for a new supercharger and stored in the ECU 240 as a two-dimensional lookup table (SC Performance Table) having a form illustrated in FIG. 5, which is indexed by values of first and second parameters (respectively PAR 1 and PAR 2). For the supercharger diagnostic process, values of volumetric flow through the supercharger in the SC Performance Table are indexed by supercharger speed ($RPM_{SC}$) and pressure ratio ($P_{out}/P_{in}$). The speed of the supercharger can be obtained conventionally by way of a speed sensor (not shown) from the source of the supercharger input drive, such as a crankshaft, or a variable speed drive. A first supercharger mass flow value ($W_{sc1}$, in kg/s) can then be calculated by multiplying a supercharger inlet density calculated from supercharger inlet pressure ($P_{in}$) and supercharger temperature ($T_{in}$, measured by temperature sensor 257) with the value of supercharger volumetric flow obtained from the SC Performance Table. With the supercharger bypass valve 231 closed, a second supercharger mass flow value ($W_{sc2}$, in kg/s) is obtained. The second mass flow value is based on the mass flow of air into the air handling system ($W_{air}$, in kg/s), which is measured by the mass air flow sensor. If the air handling system does not include EGR, $W_{sc2}=W_{air}$. If the air handling system includes EGR, then mass flow into the supercharger is obtained by adding the outputs of the mass airflow sensor and the EGR mass flow sensor ($W_{egr}$, in kg/s); thus, $W_{sc2}=W_{air}+W_{egr}$. When the supercharger bypass valve 231 is fully closed, the first supercharger mass flow value $W_{sc1}$ should be within a calibrated range of the second supercharger mass flow value $W_{sc2}$. If the performance of the supercharger drops then the flow obtained with the aid of the supercharger map will be higher than the total mass flow calculated based on $W_{air}$. As the performance of the supercharger deteriorates this difference will increase until a predefined limit $L_1$ is reached.

Figure 6:
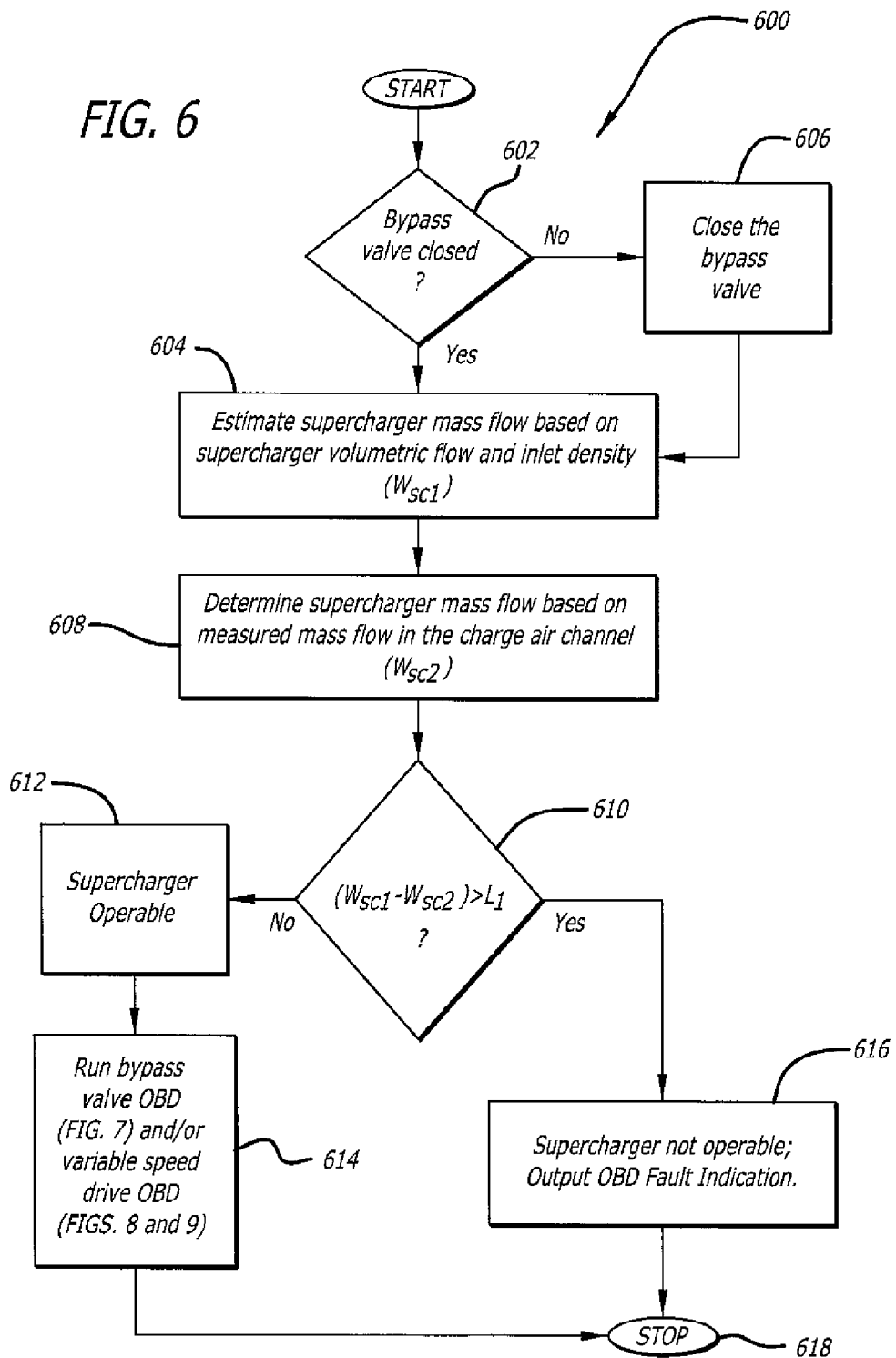
FIG. 6 is a flow diagram of an on-board supercharger diagnostic process that can be used with the air handling system of FIG. 2.

FIG. 6 illustrates one embodiment of an on-board supercharger diagnostic process 600 that can be used with the air handling system of FIG. 2 and/or during state 406 of process 400. In state 602, the setting of the supercharger bypass valve 231 is determined. If the valve is closed, the process transitions to state 604; if not, the valve is closed in state 606 and the process transitions to state 604. In state 604, the mass flow value $W_{SC1}$ is determined, and then the second mass flow value $W_{SC2}$ is determined in state 608. The process 600 then transitions to state 610, where a comparison value is obtained and a decision is then made as to whether the comparison value meets a mass flow performance measure defined by the predetermined performance limit $L_1$, as determined by ($W_{sc1}-W_{sc2}>L_1$). If the limit $L_1$ is not exceeded, the supercharger is performing within specifications and, in state 612, the diagnostic process correlates the comparison value with the diagnostic conclusion that the supercharger is operable to provide compressed charge air to the piston-controlled intake ports of the opposed-piston engine. The process then transitions to state 614 where another OBD process is run. If the limit is exceeded, then the supercharger performance is deteriorating and the diagnostic process, in state 616, correlates the comparison value with the diagnostic conclusion that the supercharger is not operable to provide compressed charge air to the piston-controlled intake ports of the opposed-piston engine and the process 600 transitions to state 614, at which event, the OBD monitor is triggered and a supercharger performance fault indication is output. The process stops in state 618.

From state 614 the ECU 240 executes another diagnostic process according to an overall air handling control scheme. For example, the ECU 240 may execute a supercharger bypass valve diagnostic process and/or a supercharger variable-speed drive diagnostic process.

Supercharger Bypass Valve Diagnostic Process:

With reference to FIGS. 2 and 3, the boost in charge air pressure provided by the supercharger 210 to the intake ports 154 is controlled by adjusting the opening (position) of the supercharger bypass valve 231. Preferably, the supercharger bypass valve 231 is operated by an electro-mechanical actuator 234 under control of the ECU 240. In this regard, the ECU 240 generates a bypass valve set command (BV_SET) that is converted by interface electronics to a control signal communicated to the actuator 234. For example, the control signal may comprise a pulse-width modulated (PWM) signal that causes the actuator 234 to set the bypass valve 231 to a position in a range between a fully closed position where no charge air passes through the valve and fully open position. Preferably, a position sensor 236 generates a signal indicating the valve's current setting. If the bypass valve performance drops below an acceptable limit then the air handling system will be unable to provide the desired amount of charge air and recirculated exhaust to the engine, and thus may fail to meet emission requirements. Consequently, it is useful to provide an OBD process to evaluate operation of the supercharger bypass valve.

In the following discussions, the air handling parameters are represented by the following notations (in which "SC" denotes the supercharger):

$W_{SC\_valve}$=Mass flow rate through bypass valve (kg/s)
$W_{SC\_table}$=Mass flow rate through the SC estimated from SC Performance Table (kg/s)
$W_{air}$=Mass flow rate of fresh air into the air handling system (kg/s)
$W_{egr}$=Mass flow rate of EGR into the charge air subsystem (kg/s)
$A_{eff}$=Effective flow area of the bypass valve (m²) based on valve opening
$BV_{set}$=Current open setting of the bypass valve
$\theta_{valve}$=Bypass valve open percentage (current open setting/max open setting)
$P_{out}$=SC outlet pressure (Pa)
$P_{in}$=SC inlet pressure (Pa)
$T_{out}$=SC inlet temperature (K)
$C_d$=Discharge coefficient for the bypass valve
$\gamma$=Ratio of constant pressure & constant volume specific heat of charge going through the SC The mass flow rate of charge air through the supercharger $W_{SC}$ is determined with the use of volumetric flow value obtained from the SC Performance Table as set forth in the description of the supercharger diagnostic process. For the bypass valve diagnostic process, this parameter value is denoted as $W_{SC\_table}$. When the bypass valve is in use, i.e. it is not fully closed, then the mass flow through the bypass valve can be calculated as follows:

$$W_{SC\_valve}=W_{SC\_table}-W_{air} \text{ (without EGR)};$$
$$W_{SC\_valve}=W_{SC\_table}-W_{air}-W_{egr} \text{ (with EGR)}.$$

Based on $W_{SC\_valve}$, an effective bypass valve flow path diameter can be calculated by modeling the valve as an orifice, for example, by:

$$A_{eff} = W_{sc\_valve}/C_d \frac{P_{sc\_out}}{\sqrt{RT_{sc\_out}}} \sqrt{\frac{2\gamma}{\gamma-1}\left(\left(\frac{P_{sc\_out}}{P_{sc\_in}}\right)^{\frac{2}{\gamma}} - \left(\frac{P_{sc\_out}}{P_{sc\_in}}\right)^{\frac{\gamma+1}{\gamma}}\right)}.$$

The discharge coefficient $C_d$ for the bypass valve can be obtained empirically by experimental testing, and the coefficient value can be stored in ECU memory. During execution of the bypass valve diagnostic process, the effective valve area can then be converted into valve position based on a look up table that maps the valve position to effective area.

$$\theta_{sc\_valve}=f^{-1}(A_{eff})$$

The modeled valve position is then compared to measured valve position ($BV_{set}$) from the sensor 236. If the difference is greater than an acceptable limit then a fault with the bypass valve is detected and appropriate action can be taken to satisfy OBD requirements.

If no fault is detected with use of the sensor 236, then the next step is to determine degradation, if any, of the bypass valve operation (for example, due to a sticky valve). In order to accomplish the task, the commanded control signal valve (PWM pulse width, for example) is converted into an expected valve position based on table look up, as follows:

$$\theta_{sc\_valve} = f(SC\_Valve\_PWM)$$

If the estimated valve position differs from measured valve position by more than an acceptable limit then a fault with the bypass valve can be set and appropriate action can be taken.

It should be noted that the bypass valve actuator 234 may have current measurement capability (internal to the ECU 240), in which case the bypass valve position can be estimated based on current drawn by the actuator 234. This would effectively detect supercharger-related faults resulting from a faulty actuator and/or wiring defects.

Figure 7:
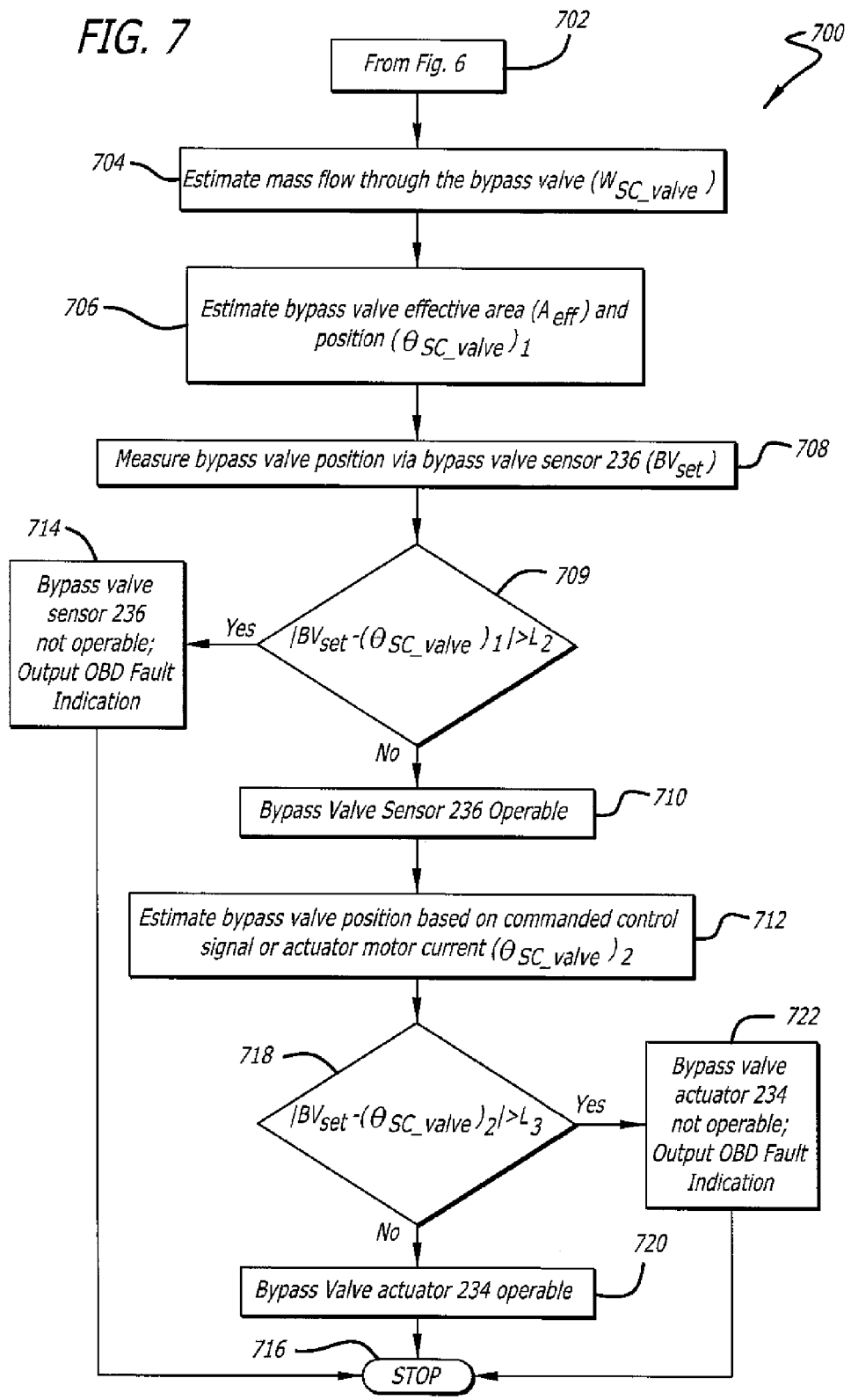
FIG. 7 is a flow diagram of an on-board supercharger bypass valve diagnostic process that can be used with the air handling system of FIG. 2.

FIG. 7 illustrates one embodiment of an on-board supercharger bypass valve diagnostic process 700 that can be used with the air handling system of FIG. 2 and/or during state 406 of process 400. The process 700 starts at state 702 and proceeds to state 704 wherein an estimate of the bypass valve mass flow rate $W_{SC\_valve}$ is made. Then, in state 706 a first bypass valve position based upon $A_{eff}$ is estimated. In state 708, a second bypass valve position is determined from the measurement provided by the sensor 236. In state 709, the first bypass valve position and the second bypass valve position are compared to establish a bypass valve position comparison value and a decision is then made as to whether the comparison value meets a bypass valve position measure defined by a predetermined performance limit $L_2$. If the limit $L_2$ is not exceeded, the bypass valve position sensor is performing within specifications and the diagnostic process in state 710 correlates the comparison value with the diagnostic conclusion that the bypass valve position sensor 236 is operable to provide the bypass valve position. The process then continues to state 712. Otherwise, if the bypass valve position comparison value exceeds $L_2$, the process 700, in state 714 determines that the bypass valve position sensor 236 is faulty and correlates the comparison value with the diagnostic conclusion that the bypass valve position sensor is not operable to provide the bypass valve position. The OBD monitor is triggered and a supercharger bypass valve performance fault indication is output. The process 700 then stops in state 716.

If the process 700 transitions to state 712, a third bypass valve position is determined based upon an actuator control signal (for example, a PWM signal) or the current drawn by the bypass valve actuator 234. In state 718, the third bypass valve position and a fourth bypass valve position determined from the measurement provided by the sensor 236 (the first bypass valve position may be used or a new measurement may be made) are compared to establish a second bypass valve position comparison value. If the comparison value meets a bypass valve position measure defined by a predetermined performance limit $L_3$ (if the limit $L_3$ is not exceeded), the bypass valve position actuator 234 is performing within specifications and, in state 720, the diagnostic process 700 correlates the comparison value with the diagnostic conclusion that the bypass valve 234 is operable to shunt charge air from the charge air channel. The process then ends in state 716. Otherwise, if the second bypass valve position comparison value exceeds $L_3$, the process 700, in state 722 determines that the bypass valve 234 is faulty and correlates the comparison value with the diagnostic conclusion that the bypass valve is not operable to shunt charge air from the charge air channel, at which event the OBD monitor is triggered and a supercharger bypass valve position sensor performance fault indication is output. The process then ends in state 716.

First Variable-Speed Drive Diagnostic Process:

A supercharger may be equipped for independently-variable speed operation by way of an auxiliary transmission under open- or closed-loop governance of the air handling control mechanization. Such an arrangement may include a continuously-variable transmission (CVT), also called a "variator". The arrangement may also cover a stepwise-variable transmission, also called a "multi-speed" transmission, one example of which is the dual-speed supercharger of Antonov Automotive Technologies Ltd. In either case, the drive is referred to as a "variable-speed drive."

A failure in operation of the variable-speed drive can significantly impact the performance of the engine in respect of output power and emission levels. For example, when the variable-speed drive cannot shift to a desired high-speed setting, high airflow requirements cannot be met and poor combustion will result, which can lead to the production of increased soot and other undesirable exhaust emissions. On the other hand, when the variable-speed drive cannot lower the speed of the supercharger under low load conditions, excessive boost can result that may cause engine damage. Consequently, it is useful to provide an OBD process to evaluate operation of the supercharger variable speed drive.

In operation, a variable-speed drive receives a mechanical input drive at an input speed (say, $RPM_{in}$) and provides a mechanical output drive at an output speed (say, $RPM_{out}$). The output drive is coupled to the input shaft of the supercharger and causes one or more elements of the supercharger's compression mechanism to rotate, and so the output speed of the drive ($RPM_{out}$) is effectively the speed of the supercharger. Air fed at some input pressure ($P_{in}$) into the compression mechanism is compressed (pressurized) and the compressed air is output at some output pressure ($P_{out}$) by the supercharger The pressure ratio ($P_{out}/P_{in}$) of the output pressure to the input pressure is varied by varying the speed of the supercharger's input shaft. It is useful to control air handling system operation by varying the pressure ratio of the supercharger in order to optimize engine performance throughout its operating range. This is done by varying the drive ratio ($DR=RPM_{out}/RPM_{in}$) of the variable-speed drive. Depending on the construction of the variable-speed drive, the drive ratio can be varied continuously, or in discrete increments.

With reference to FIGS. 2 and 3, in the air handling system 200 shown the drive 212 may be constructed as a variable-speed drive. The variable-speed drive 212 may be driven by an electro-mechanical actuator 215 under control of the ECU 240. In this regard, the ECU command (VAR_SP_RAT_SET) is converted by interface electronics to a control signal—for example a pulse-width modulated (PWM) signal—that is coupled to the actuator 215. With this control configuration, a drive ratio (DR) of the variable speed drive 212 can be set, thereby enabling variable control of the speed of the supercharger, independent of crankshaft speed. Although the variable speed drive 212 and actuator 215 are shown as separate elements in the figure, this is not intended to be limiting as they may be integrated into a single unit.

A supercharger variable-speed drive performance diagnostic compares a change in the pressure ratio $\Delta(P_{out}/P_{in})$ across the supercharger 210 that occurs in response to a change supercharger speed caused by a change in the drive ratio $\Delta(DR)$. The drive ratio is changed by a control signal communicated to the variable speed drive 212. If the variable-speed drive 212 is operating correctly, a change in the drive ratio during the diagnostic routine will cause a corresponding change in the pressure ratio. If the operation of the variable-speed drive 212 is faulty, a change in the drive ratio will cause little or no change in the pressure ratio. The pressure ratio may be measured by noting the difference between the inlet and outlet pressures of the supercharger 210, as indicated by the gas pressure sensors 252 and 254 respectively. If it is the case that the air handling system also includes the bypass valve 231, the valve is held at a predetermined calibratable state as a variable-speed drive diagnostic process is executed.

Figure 8:
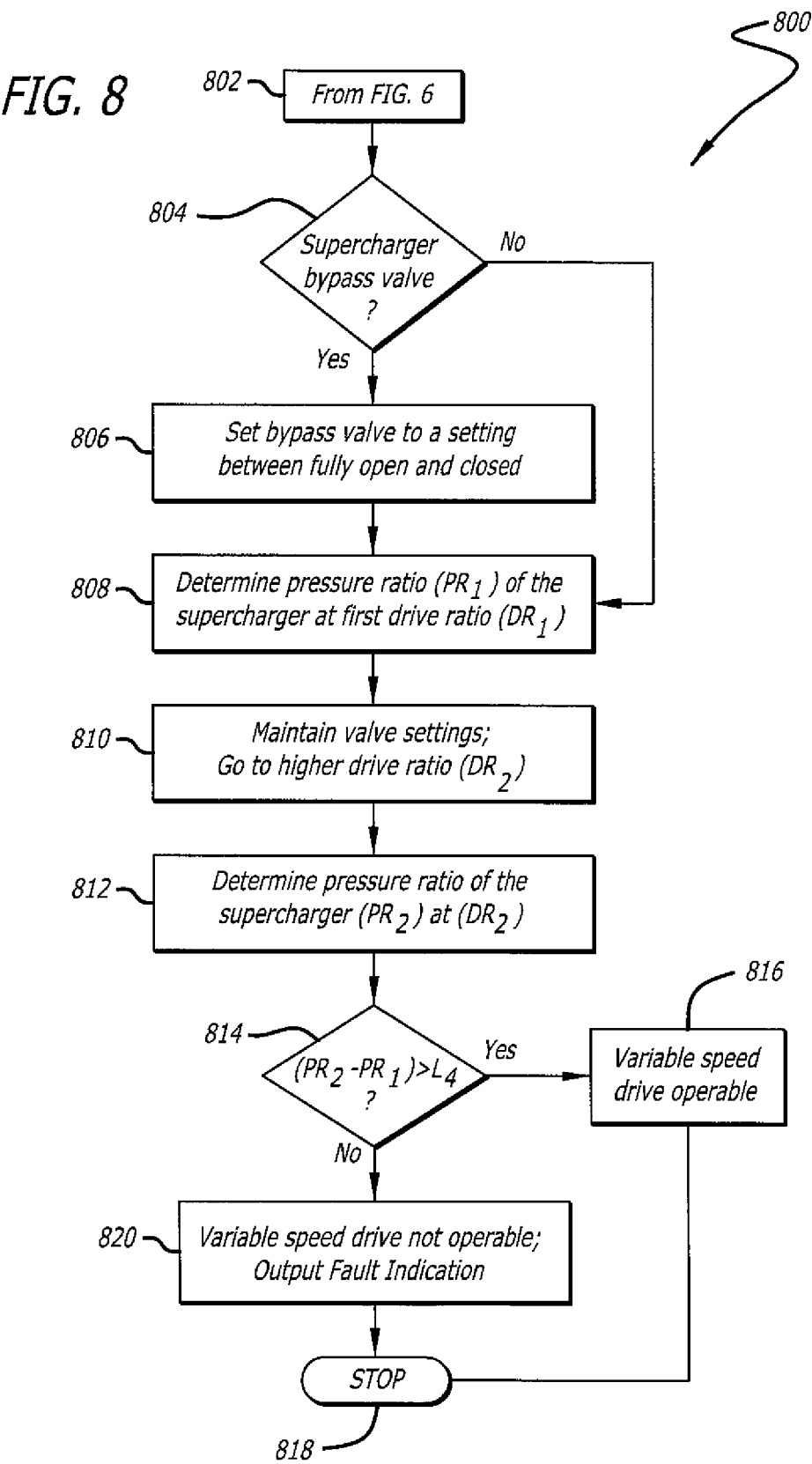
FIG. 8 is a diagram of a first on-board supercharger variable speed drive diagnostic process that can be used with the air handling system of FIG. 2.

FIG. 8 illustrates one embodiment of an on-board supercharger variable-speed drive diagnostic process 800 that can be used with the air handling system of FIG. 2 and/or during state 406 of process 400. Preferably, but not necessarily, the process 800 runs while the engine is in an idle mode of operation. The process 800 starts at state 802. At state 804, if the engine includes a supercharger bypass valve then the process transitions through state 806 where the bypass valve 231 is set to a predetermined calibratable state in which it is not fully open. (If the bypass valve is fully open the pressure ratio across the supercharger will be nearly equal to 1, for every setting of the variable speed drive, and no meaningful diagnostic results can be obtained). Of course, states 804 and 806 can be omitted altogether if there is no bypass valve, in which case the process 800 would proceed directly from state 802 to state 808. In state 808, the variable speed drive 212 is set to a first drive ratio ($DR_1$) and a calculation of a first supercharger pressure ratio $PR_1$ is made. Then, in state 810, while maintaining air handling valve settings (bypass, wastegate, back pressure, EGR, for example), the process 800 sets the variable-speed drive to a second drive ratio ($DR_2$), for example a higher drive ratio, and transitions to state 812 where a second supercharger pressure ratio $PR_2$ is obtained. In state 814, the first pressure ratio $PR_1$ and the second pressure ratio $PR_2$ are compared to establish a variable-speed drive comparison value and a decision is then made as to whether the comparison value meets a variable-speed drive measure defined by a predetermined performance limit $L_4$. If the limit $L_4$ is exceeded, the variable-speed drive is performing within specifications and the diagnostic process 800 in state 816 correlates the comparison value with the diagnostic conclusion that the variable-speed drive 212 is operable to drive the supercharger 210. The process ends in state 818. Otherwise, if the variable-speed drive comparison value does not exceed $L_4$, the process 800, in state 820 determines that the variable-speed drive 212 is faulty and correlates the comparison value with the diagnostic conclusion that the variable-speed drive is not operable to drive the supercharger. The OBD monitor is triggered and a variable-speed drive performance fault indication is activated. The process ends in state 816.

Second Variable-Speed Drive Diagnostic Process:

In some instances where the air handling system utilizes both a supercharger bypass valve and a variable speed drive to control operation of the supercharger, a second supercharger variable-speed drive performance on-board diagnostic may be useful for detecting a fault in the actuator 215 of the variable-speed drive 212. Referring to FIG. 3, this diagnostic process presumes the air handling control mechanization control routines 242 include a closed-loop process that controls the setting of the bypass valve 231. In this regard, during a steady-state engine operating condition the closed-loop process maintains the pressure ratio across the supercharger 210 at some predetermined value by means of the bypass valve 231 (BV_SET). When the drive ratio is changed, the supercharger speed will change. In order to maintain the same commanded airflow supply to the engine, the supercharger bypass valve position (BV_SET) will be changed by the closed-loop process. For example, when going to a higher drive ratio, the bypass valve 231 would be opened more to maintain the same required airflow through the engine.

Figure 9:
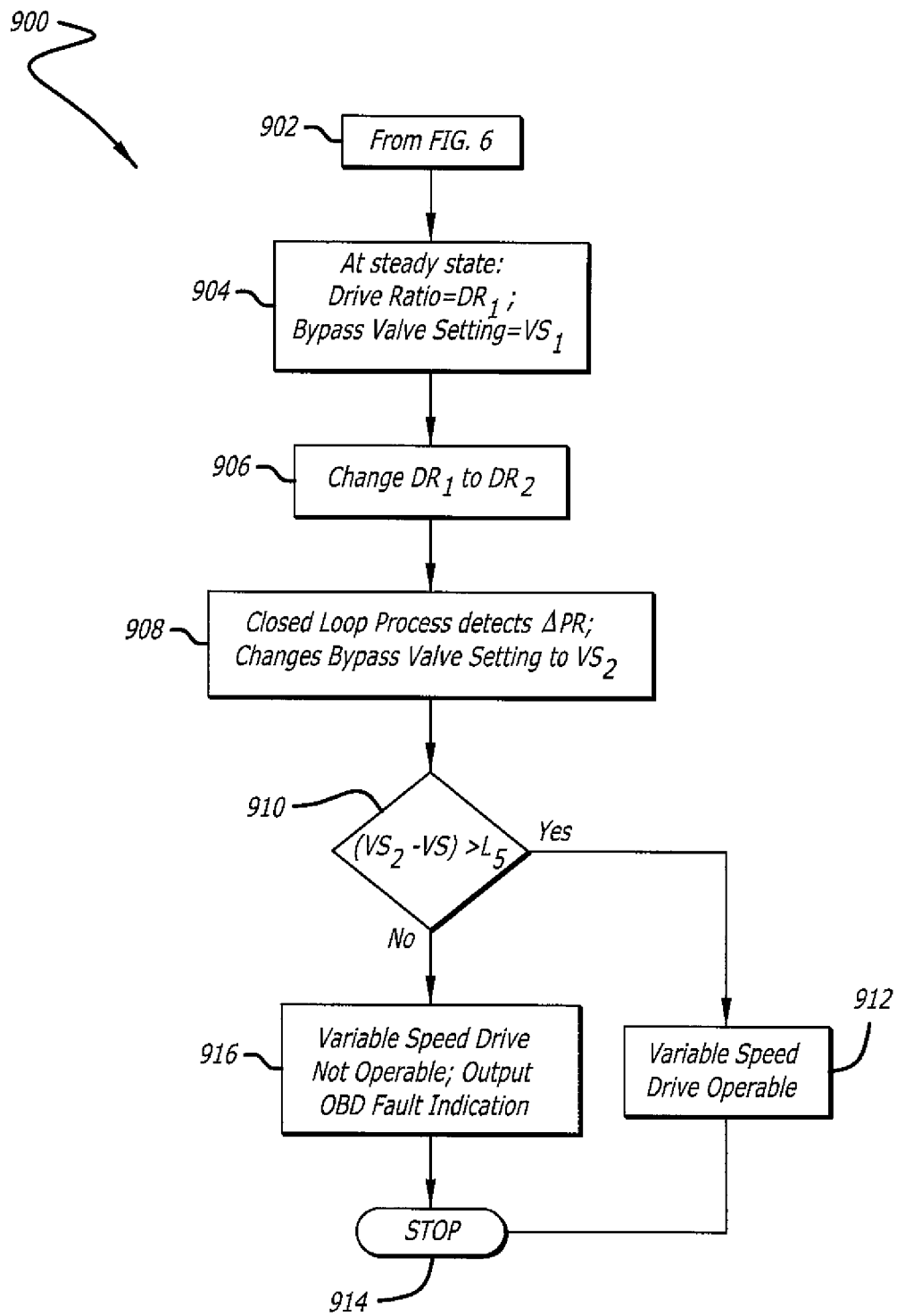
FIG. 9 is a diagram of a second on-board supercharger variable speed drive diagnostic process that can be used with the air handling system of FIG. 2.
Figure 2:
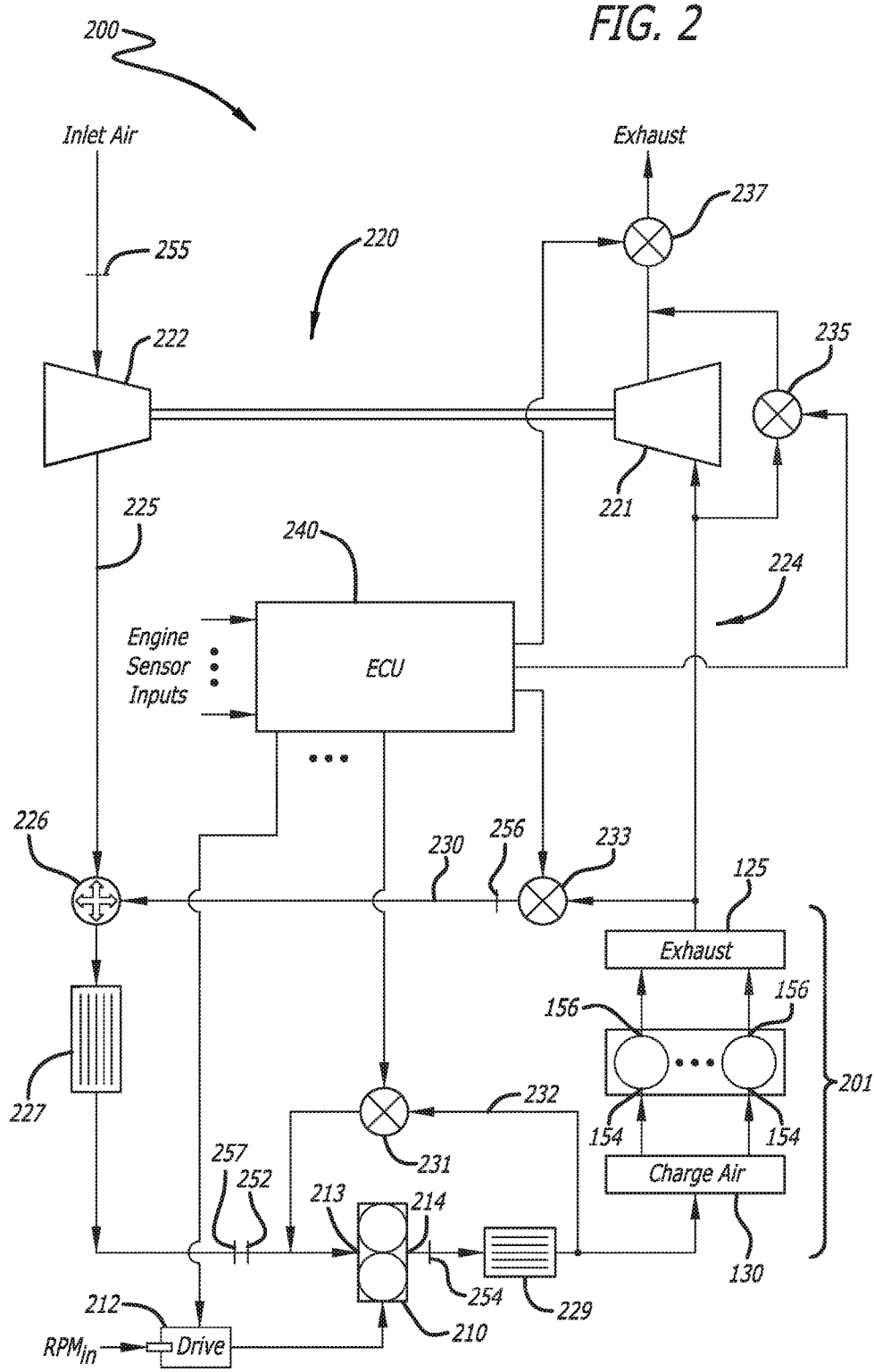
Figure 9:
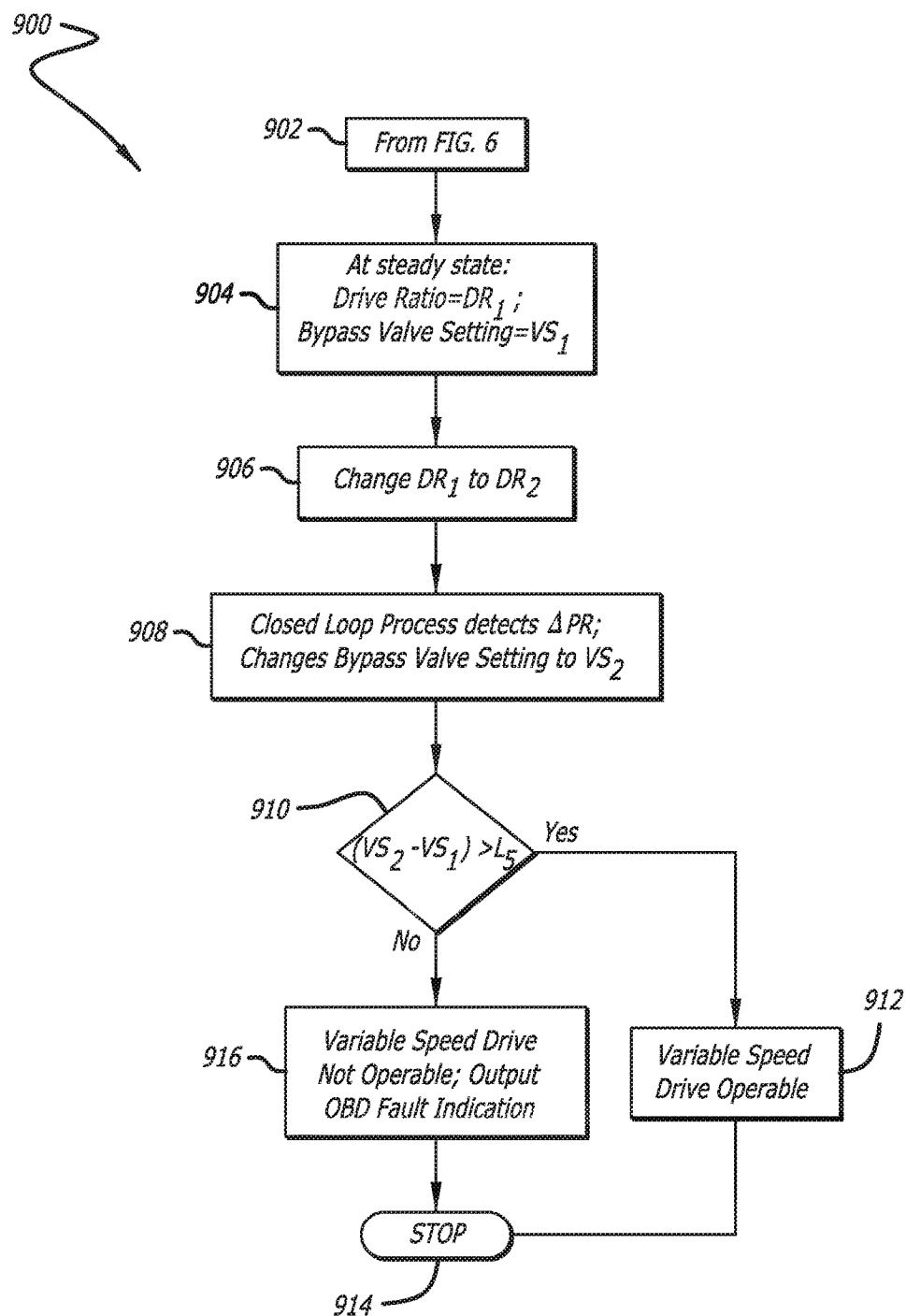

FIG. 9 illustrates a second embodiment of an on-board supercharger variable-speed drive diagnostic process 900 that can be used with the air handling system of FIG. 2 and/or during state 406 of process 400. This embodiment presumes the presence of both a supercharger variable-speed drive and a supercharger bypass valve. The process is initiated in state 902. In state 904 the engine is running at some steady state under control of a closed-loop process which maintains a drive ratio at $DR_1$ and a bypass valve setting (VS) at $VS_1$. In state 906, the process 900 causes the drive ratio to be changed (preferably, increased) to another value $DR_2$ by changing the command setting VAR_SP_RAT_SET. In state 908, the closed-loop control process detects the change in pressure ratio and attempts to compensate by changing the bypass valve setting to $VS_2$. In state 910, the process 900 then transitions to state 910, where a bypass valve setting comparison value is obtained and a decision is then made as to whether the comparison value meets a bypass valve performance measure defined by the predetermined performance limit $L_5$, as determined by ($VS_2-VS_1>L_5$). If the limit $L_5$ is exceeded, the supercharger variable-speed drive is performing within specifications and the diagnostic process correlates the comparison value with the diagnostic conclusion that the supercharger variable-speed drive is operable. The process 900 then stops at state 914. If the limit is not exceeded, then the variable-speed drive performance is deteriorating and the diagnostic process, in state 916, correlates the comparison value with the diagnostic conclusion that the variable-speed drive is not operable to drive the supercharger, at which event, the OBD monitor is triggered and a variable-speed drive fault indication is output.

Although this disclosure describes particular on-board diagnostics embodiments for the air handling system of an opposed-piston engine, these embodiments are set forth merely as examples of underlying principles of this disclosure. Thus, the embodiments are not to be considered in any limiting sense.

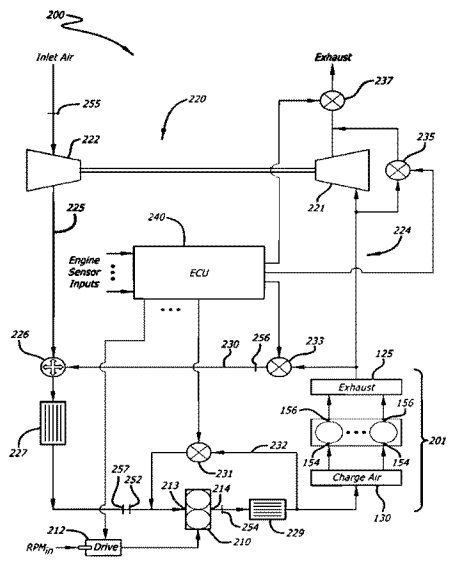

The invention claimed is:

1. A diagnostic system for an opposed-piston engine including at least one cylinder with piston-controlled exhaust and intake ports near respective ends of the cylinder, a charge air channel to provide charge air to at least one intake port of the engine, and a supercharger having an inlet and an outlet in the charge air channel to provide compressed charge air to the piston-controlled intake ports of the opposed-piston engine, comprising:
   a drive unit mechanically coupling the supercharger to the engine;
   a first gas pressure sensor for generating a first signal indicating a supercharger inlet charge air pressure ($P_{in}$) in the charge air channel;
   a second gas pressure sensor in the charge air channel for generating a second signal indicating a supercharger outlet charge air pressure ($P_{out}$) in the charge air channel; and,
   an engine control unit in data signal communication with the first and second gas pressure sensors for diagnosing operation of the supercharger by:
      determining a first supercharger mass flow value based upon the ratio ($P_{out}/P_{in}$);

determining a second supercharger mass flow value based upon a value of mass air flow into the charge air channel;

comparing the first and second supercharger mass flow values to determine a mass flow comparison value; and, if the mass flow comparison value meets a mass flow performance measure, correlating the mass flow comparison value with the diagnostic conclusion that the supercharger is operable to provide compressed charge air to the piston-controlled intake ports of the opposed-piston engine; and, providing a control signal to begin diagnosis of one of a supercharger bypass valve and a supercharger variable speed drive; otherwise, correlating the mass flow comparison value with the diagnostic conclusion that the supercharger is not operable to provide compressed charge air to the piston-controlled intake ports of the opposed-piston engine; and, triggering a monitor to output a supercharger fault indication.

2. A diagnostic system according to claim 1, in which the opposed-piston engine further includes a supercharger bypass valve in fluid communication with the charge air channel downstream of the supercharger outlet and a bypass valve position sensor, and the engine control unit is operable to diagnose operation of the supercharger bypass valve position sensor by:

determining a first bypass valve position based upon a valve effective area;

determining a second bypass valve position provided by the bypass valve position sensor;

comparing the first and second bypass valve positions to determine a bypass valve position comparison value; and, if the bypass valve position comparison value meets a bypass valve performance measure, correlating the bypass valve position comparison value with the diagnostic conclusion that the bypass valve position sensor is operable to provide an indication of the bypass valve position; otherwise, correlating the bypass valve position comparison value with the diagnostic conclusion that the bypass valve position sensor is not operable to provide an indication of the bypass valve position; and, triggering the monitor to output a bypass valve position sensor fault indication.

3. A diagnostic system according to claim 2 in which the engine control unit is further operable to diagnose operation of the supercharger bypass valve by:

determining a third bypass valve position based upon one of a bypass valve control signal and a bypass valve actuator current;

determining a fourth bypass valve position based upon measurement of the bypass valve position;

comparing the third and fourth bypass valve positions to determine a second bypass valve position comparison value; and, if the second bypass valve position comparison value meets a second bypass valve performance measure, correlating the second bypass valve position comparison value with the diagnostic conclusion that the bypass valve is operable to shunt charge air from the charge air channel; otherwise, correlating the second bypass valve position comparison value with the diagnostic conclusion that the bypass valve is not operable to shunt charge air from the charge air channel; and, triggering the monitor to output a bypass valve fault indication.

4. A diagnostic system according to claim 1, in which the drive unit includes a variable-speed drive coupled to drive the supercharger from a crankshaft of the engine, and the engine control unit is operable to detect a fault in operation of the variable-speed drive by:

setting the variable-speed drive to a first drive ratio;

determining a first supercharger pressure ratio at the first drive ratio setting of the variable-speed drive;

changing the variable-speed drive to a second drive ratio;

determining a second supercharger pressure ratio at the second drive ratio setting of the variable-speed drive;

comparing the first and second supercharger pressure ratios to determine a supercharger pressure ratio comparison value; and, if the supercharger pressure ratio comparison value meets a supercharger pressure ratio performance measure, correlating the supercharger pressure ratio comparison value with the diagnostic conclusion that the variable-speed drive is operable to drive the supercharger; otherwise, correlating the supercharger pressure ratio comparison value with the diagnostic conclusion that the variable-speed drive is not operable to drive the supercharger; and, triggering the monitor to output a variable-speed drive fault indication.

5. A diagnostic system according to any one of claims 1, 2, 3, or 4, in which the opposed-piston engine further includes an EGR channel and determining the second supercharger mass flow value includes combining the value of mass air flow into the charge air channel with a value of mass exhaust flow in the EGR channel.

6. A method for on-board diagnosis of air handling system faults of an opposed-piston engine including at least one cylinder with piston-controlled exhaust and intake ports near respective ends of the cylinder, a charge air channel to provide charge air to at least one intake port of the engine, and a supercharger having an inlet and an outlet in the charge air channel to provide compressed charge air to the piston-controlled intake ports of the opposed-piston engine, comprising the steps of:

mechanically coupling the supercharger to the engine;

providing a first gas pressure sensor upstream of the supercharger inlet and a second gas pressure sensor downstream of the supercharger outlet;

determining a supercharger inlet charge air pressure ($P_{in}$) in the charge air channel with the first gas pressure sensor;

determining a supercharger outlet charge air pressure ($P_{out}$) in the charge air channel with the second gas pressure sensor;

determining a first supercharger mass flow value based upon the ratio ($P_{out}/P_{in}$);

determining a second supercharger mass flow value based upon a value of mass air flow into the charge air channel;

comparing the first and second supercharger mass flow values to determine a mass flow comparison value; and, if the mass flow comparison value meets a mass flow performance measure, correlating the mass flow comparison value with the diagnostic conclusion that the supercharger is operable to provide compressed charge air to the piston-controlled intake ports of the opposed-piston engine; and, providing a control signal to begin diagnosing one of a supercharger bypass valve and a supercharger variable speed drive; otherwise, correlating the mass flow comparison value with the diagnostic conclusion that the supercharger is not operable to provide compressed charge air to the piston-controlled intake ports of the opposed-piston engine; and, triggering a monitor to output a supercharger fault indication.

7. A method according to claim 6, in which the opposed-piston engine further includes a supercharger bypass valve in fluid communication with the charge air channel downstream of the supercharger outlet and a bypass valve position sensor, wherein diagnosing a fault in operation of the supercharger bypass valve includes:

determining a first bypass valve position based upon a bypass valve effective area;

determining a second bypass valve position provided by the bypass valve position sensor;

comparing the first and second bypass valve positions to determine a bypass valve position comparison value; and, if the bypass valve position comparison value meets a bypass valve performance measure, correlating the bypass valve position comparison value with the diagnostic conclusion that the bypass valve position sensor is operable to provide an indication of the bypass valve position; otherwise, correlating the bypass valve position comparison value with the diagnostic conclusion that the bypass valve position sensor is not operable to provide an indication of the bypass valve position; and, triggering the monitor to output a bypass valve position sensor fault indication.

8. A method according to claim 7, wherein diagnosing a fault in operation of the supercharger bypass valve further includes:

determining a third bypass valve position based upon one of a bypass valve position control signal and a bypass valve actuator current;

determining a fourth bypass valve position based upon measurement of the bypass valve position;

comparing the third and fourth bypass valve positions to determine a second bypass valve position comparison value; and, if the second bypass valve position comparison value meets a second bypass valve performance measure, correlating the second bypass valve position comparison value with the diagnostic conclusion that the bypass valve is operable to shunt charge air from the charge air channel; otherwise, correlating the second bypass valve position comparison value with the diagnostic conclusion that the bypass valve is not operable to shunt charge air from the charge air channel; and, triggering the monitor to output a bypass valve fault indication.

9. A method according to claim 6, in which the engine further includes a supercharger variable speed drive coupled to drive the supercharger from the crankshaft, wherein diagnosing a fault in operation of the variable-speed drive includes:

setting the variable-speed drive to a first drive ratio setting;

determining a first supercharger pressure ratio at the first drive ratio setting of the variable-speed drive;

changing the variable-speed drive to a second drive ratio setting;

determining a second supercharger pressure ratio at the second drive ratio setting of the variable-speed drive;

comparing the first and second supercharger pressure ratios to determine a supercharger pressure ratio comparison value; and, if the supercharger pressure ratio comparison value meets a supercharger pressure ratio performance measure, correlating the supercharger pressure ratio comparison value with the diagnostic conclusion that the variable-speed drive is operable to drive the supercharger; otherwise, correlating the supercharger pressure ratio comparison value with the diagnostic conclusion that the variable-speed drive is not operable to drive the supercharger; and, triggering the monitor to output a variable-speed drive fault indication.

10. A method according to any one of claims 6, 7, 8, or 9, in which the opposed-piston engine further includes an EGR channel and determining the second supercharger mass flow value includes combining the value of mass air flow into the charge air channel with a value of mass exhaust flow in the EGR channel.

11. An on-board diagnostic system of an opposed-piston engine comprising a compressor followed by a supercharger in a two-stage compression configuration coupled to a cylinder intake port of the engine, and a supercharger bypass valve to modulate charge air pressure at the intake port, in which the on-board diagnostic system comprises an actuating means for opening and closing the supercharger bypass valve, a control means responsive to closure of the supercharger bypass valve for comparing an estimated mass airflow through the supercharger with a measured mass airflow through the supercharger, and a diagnostic means for (i) evaluating performance of the supercharger based on the comparison, and (ii) triggering output of a supercharger fault indication if the comparison fails to meet a mass flow performance measure.

* * * * *

UNITED STATES PATENT AND TRADEMARK OFFICE
CERTIFICATE OF CORRECTION

PATENT NO. : 9,982,617 B2
APPLICATION NO. : 14/560612
DATED : May 29, 2018
INVENTOR(S) : Nagar et al.

It is certified that error appears in the above-identified patent and that said Letters Patent is hereby corrected as shown below:

On the Title Page

Delete title page and substitute therefore with the attached title page consisting of the corrected illustrative figure.

In the Drawings

Sheet 2, FIG. 2, the reference numeral "251" should read --257-- as shown on attached replacement sheet.

Sheet 2, FIG. 2, the reference numeral 201 should be applied to the opposed-piston engine, as shown on the attached replacement sheet.

Sheet 8, FIG. 9, the in box referenced by numeral 910, "$(VS_2-VS)>L_5$" should read --$(VS_2-VS_1)>L_5$-- as shown on the attached replacement sheet.

In the Specification

Column 5, Line 1, and in Column 5, Line 3, each instance of "a diagram" should read --a flow diagram--.
Column 9, Line 33, "$(W_{sc1}-W_{sc2}>L_1)$" should read --$(W_{sc1}-W_{sc2})>L_1$--.
Column 9, Line 61, "actuator 234 under" should read --actuator under--.
Column 9, Lines 64 and 66, each instance of "the actuator 234" should read --the bypass valve actuator 234--.
Column 11, Line 56, "the bypass valve position actuator 234" should read --the bypass valve actuator 234--.
Column 11, Lines 59 and 62, each instance of "the bypass valve 234" should read --the bypass valve actuator 234--.
Column 14, Lines 21-22, "In state 910, the process" should read --The process--.
Column 14, Line 27, "$(VS_2-VS_1>L_5)$" should read --$(VS_2-VS_1)>L_5$--.

Signed and Sealed this
Twentieth Day of November, 2018

Andrei Iancu
*Director of the United States Patent and Trademark Office*

(12) United States Patent
Nagar et al.

(10) Patent No.: US 9,982,617 B2
(45) Date of Patent: May 29, 2018

(54) ON-BOARD DIAGNOSTICS FOR AN OPPOSED-PISTON ENGINE EQUIPPED WITH A SUPERCHARGER

(71) Applicant: Achates Power, Inc., San Diego, CA (US)

(72) Inventors: Nishit Nagar, San Diego, CA (US); Arunandan Sharma, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 26 days.

(21) Appl. No.: 14/560,612

(22) Filed: Dec. 4, 2014

(65) Prior Publication Data
US 2016/0160781 A1 Jun. 9, 2016

(51) Int. Cl.
| F02D 41/22 | (2006.01) |
| F02B 75/02 | (2006.01) |
| F02B 25/08 | (2006.01) |
| F02B 37/04 | (2006.01) |
| F02D 23/02 | (2006.01) |
| F02D 41/00 | (2006.01) |
| F02B 33/34 | (2006.01) |
| F02B 39/16 | (2006.01) |
| F02D 41/18 | (2006.01) |

(52) U.S. Cl.
CPC ............ *F02D 41/221* (2013.01); *F02B 25/08* (2013.01); *F02B 33/34* (2013.01); *F02B 37/04* (2013.01); *F02B 39/16* (2013.01); *F02B 75/02* (2013.01); *F02D 23/02* (2013.01); *F02D 41/0007* (2013.01); *F02D 41/222* (2013.01); *F02B 2075/025* (2013.01); *F02D 41/18* (2013.01); *Y02T 10/144* (2013.01); *Y02T 10/40* (2013.01)

(58) Field of Classification Search
CPC ... Y02T 10/144; F02D 41/0007; F02D 23/00; F02D 41/223; F02D 41/222; F02D 41/007; F02D 23/02; F02D 41/221; F02B 75/02; F02B 33/34; F02B 37/04
See application file for complete search history.

(56) References Cited

U.S. PATENT DOCUMENTS

| 5,546,795 A | 8/1996 | Yamagishi |
| 6,155,952 A | 12/2000 | Antonov |
| 6,363,713 B1 | 4/2002 | Wu et al. |
| 6,892,569 B2 | 5/2005 | Martin et al. |
| 7,055,507 B2 | 6/2006 | Kelley, Jr. |

(Continued)

FOREIGN PATENT DOCUMENTS

| DE | 102008054514 A1 | 6/2010 |
| EP | 2487356 A2 | 8/2012 |

(Continued)

OTHER PUBLICATIONS

International Search Report and Written Opinion for PCT application PCT/US2015/062292, mailed Mar. 1, 2016.

(Continued)

*Primary Examiner* — Sizo Vilakazi
(74) *Attorney, Agent, or Firm* — Terrance M. Meador

(57) ABSTRACT

On-board diagnostic monitoring of a two-stroke cycle, opposed-piston engine includes diagnostic monitoring of an air handling system equipped with a supercharger to determine whether the supercharger is functioning properly.

11 Claims, 8 Drawing Sheets